(12) United States Patent
Andis (10) Patent No.: US 8,708,176 B2
(45) Date of Patent: Apr. 29, 2014

(54) QUICK ACCESS CLOSURE APPARATUS AND METHODS OF USE

(76) Inventor: Tim Andis, Union Gap, WA (US)

( * ) Notice: Subject to any disclaimer, the term of this patent is extended or adjusted under 35 U.S.C. 154(b) by 0 days.

(21) Appl. No.: 13/519,427

(22) PCT Filed: Dec. 29, 2010

(86) PCT No.: PCT/US2010/062387
§ 371 (c)(1),
(2), (4) Date: Aug. 14, 2012

(87) PCT Pub. No.: WO2011/082246
PCT Pub. Date: Jul. 7, 2011

(65) Prior Publication Data
US 2012/0298612 A1    Nov. 29, 2012

Related U.S. Application Data

(60) Provisional application No. 61/291,016, filed on Dec. 30, 2009.

(51) Int. Cl.
*B65D 41/06* (2006.01)
(52) U.S. Cl.
USPC ........... 215/337; 215/332; 215/329; 215/341; 220/300
(58) Field of Classification Search
USPC ........... 215/300, 351, 44, 329, 338, 337, 222, 215/34, 45, 352, 332, 218; 220/295, 300, 220/293; 227/491
See application file for complete search history.

(56) References Cited

U.S. PATENT DOCUMENTS

| | | | |
|---|---|---|---|
| 133,518 A | 12/1872 | Burnap | |
| 450,827 A * | 4/1891 | Martyn | 215/332 |
| 682,293 A | 9/1901 | Taft | |
| 3,403,803 A * | 10/1968 | Markowitz | 215/218 |
| 3,739,933 A | 6/1973 | Degaetano | |
| 4,697,716 A * | 10/1987 | Mumford | 215/352 |
| 5,060,813 A * | 10/1991 | Gollasch et al. | 215/329 |
| 6,354,450 B1 * | 3/2002 | Zielinski et al. | 215/332 |
| 6,845,877 B2 * | 1/2005 | Diesterbeck | 220/782 |
| 7,165,692 B2 | 1/2007 | Konefal et al. | |
| 7,198,170 B2 | 4/2007 | Herr | |
| 7,461,755 B2 | 12/2008 | Manera et al. | |
| D616,703 S | 6/2010 | Joy et al. | |
| D628,486 S | 12/2010 | Lane | |
| 2006/0273060 A1 | 12/2006 | Fricke | |
| 2007/0144999 A1 | 6/2007 | King | |

FOREIGN PATENT DOCUMENTS

| | | |
|---|---|---|
| JP | 2002087454 | 3/2002 |
| KR | 2019810000398 | 4/1981 |
| KR | 200398918 | 10/2005 |
| KR | 1020090098634 | 9/2009 |

* cited by examiner

*Primary Examiner* — Mickey Yu
*Assistant Examiner* — Allan Stevens
(74) *Attorney, Agent, or Firm* — Lewis Roca Rothgerber LLP; Samantha A. Updegraff (57) ABSTRACT

A quick access closure apparatus including a reusable bottle and lid that secure together. The bottle has at least one protrusion and the lid has a channel and ridge.

10 Claims, 12 Drawing Sheets

QUICK ACCESS CLOSURE APPARATUS AND METHODS OF USE

CROSS-REFERENCE TO RELATED APPLICATIONS

This application claims priority to and the benefit of International PCT Application Serial No. PCT/US2010/062387, titled "Quick Access Closure Apparatus and Methods of Use", filed Dec. 29, 2010, which claims priority to and benefit of the filing of U.S. Provisional Patent Application Ser. No. 61/291,096, titled "Quick Access Closure Apparatus and Methods of Use", filed on Dec. 30, 2009 and both specifications and all claims thereof are incorporated herein by reference in their entireties.

BACKGROUND OF THE INVENTION

1. Field of the Invention (Technical Field)

Embodiments of the present invention relate to a quick access closure apparatus and methods of use.

2. Description of Related Art

Within the past few decades reusable and disposable bottles have become widely used throughout the world. Typical closure systems include a threaded lid that marries to a threaded bottle neck. In these closure systems, a user must screw and unscrew the container for several rotations to replace or remove the lid. Further, the threads create crevices and small spaces for bacteria to build.

There is a current need for a bottle opening and closing apparatus that will give a user quick access to the contents of the bottle and also securely close the container without the use of threads. Further, there is a current need for a more sanitary container closure system.

Embodiments of the present invention comprise a new apparatus and methods of use for threadless quick access closure systems.

BRIEF SUMMARY OF EMBODIMENTS OF THE PRESENT INVENTION

An embodiment of the present invention comprises a quick access closure apparatus. The apparatus preferably comprises a bottle having at least one protrusion disposed in the inner channel of the lid. The protrusion is preferably insertable into the channel and the lid is then rotatable to fit the protrusion into the ridge in order to fasten the lid to the bottle. The lid rotation is preferably less than approximately ⅛ around the bottle and more preferably approximately 1/10 around the bottle.

In one embodiment of the present invention, the apparatus further comprises an insert disposed around an inner circumference of the lid. The insert preferably comprises an o-ring. The insert is in communication with a mouth of the bottle creating a seal between the lid and the bottle. The lid can optionally comprise a groove disposed above the inner channel. The insert is then disposed in the groove. The insert can comprise a bulbous cross-section and the groove can comprise a like-shape to the insert and mate with the insert. The insert is preferably compressible.

In another embodiment of the present invention, the bottle comprises a gradual taper. An outsert is optionally disposed on the top portion of the bottle. The outsert preferably comprises the at least one protrusion. There are preferably three protrusions, wherein the protrusions form an equilateral triangle. The bottle of one embodiment of the present invention lacks threads. The bottle and lid preferably comprise recycled material. The bottle optionally comprises a rolled lip at the mouth of the bottle.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

As used herein, "bottle" is defined as a receptacle, vessel or container that can hold gas, liquid, or solid contents and that can be closed.

Figure 1A:
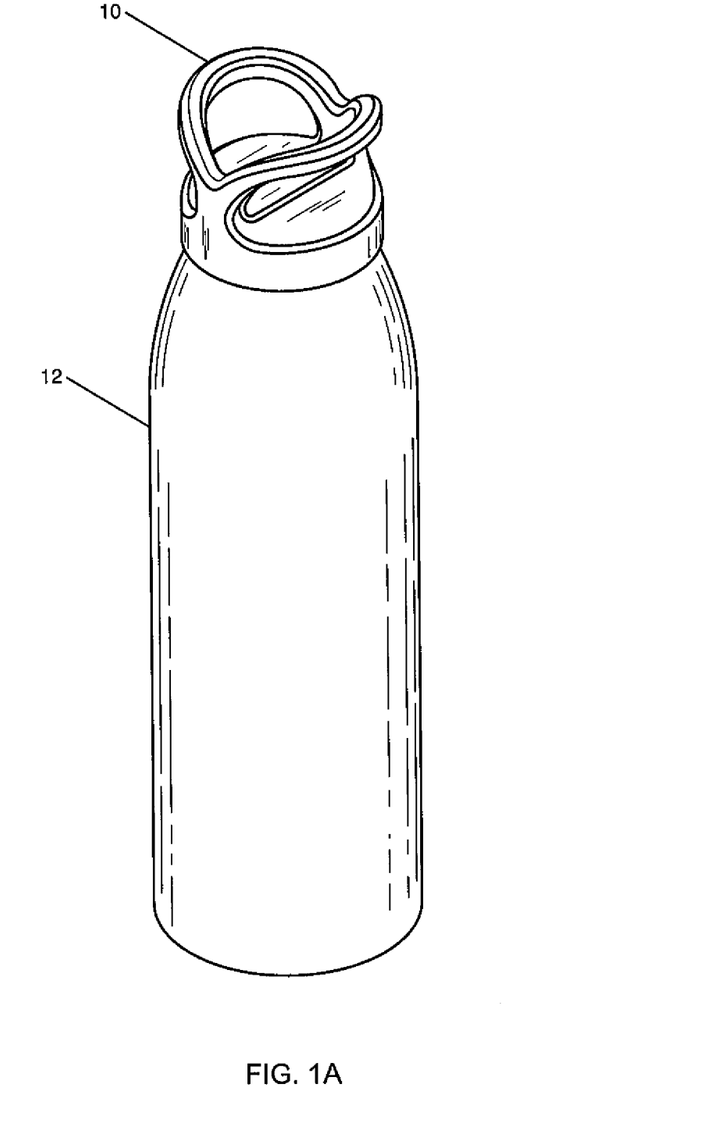
FIGS. 1A-1E illustrate an embodiment of the present invention comprising a quick access lid disposed on a bottle.
Figure 1B:
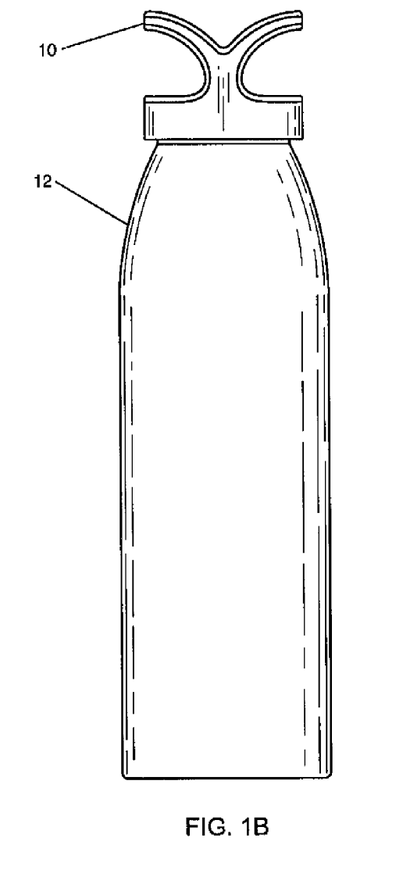
Figure 1C:
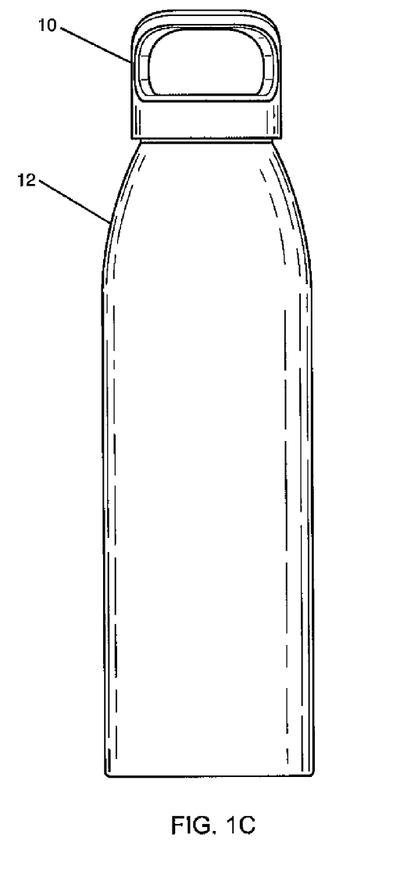
Figure 1D:
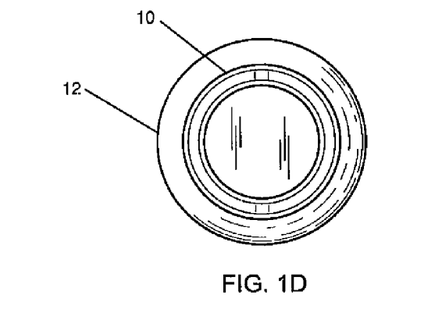
Figure 1E:
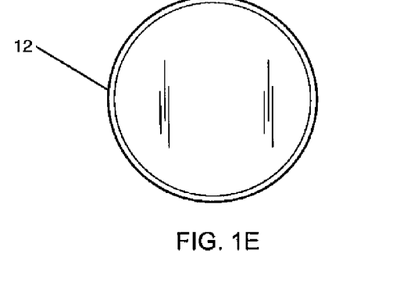
Figure 2:
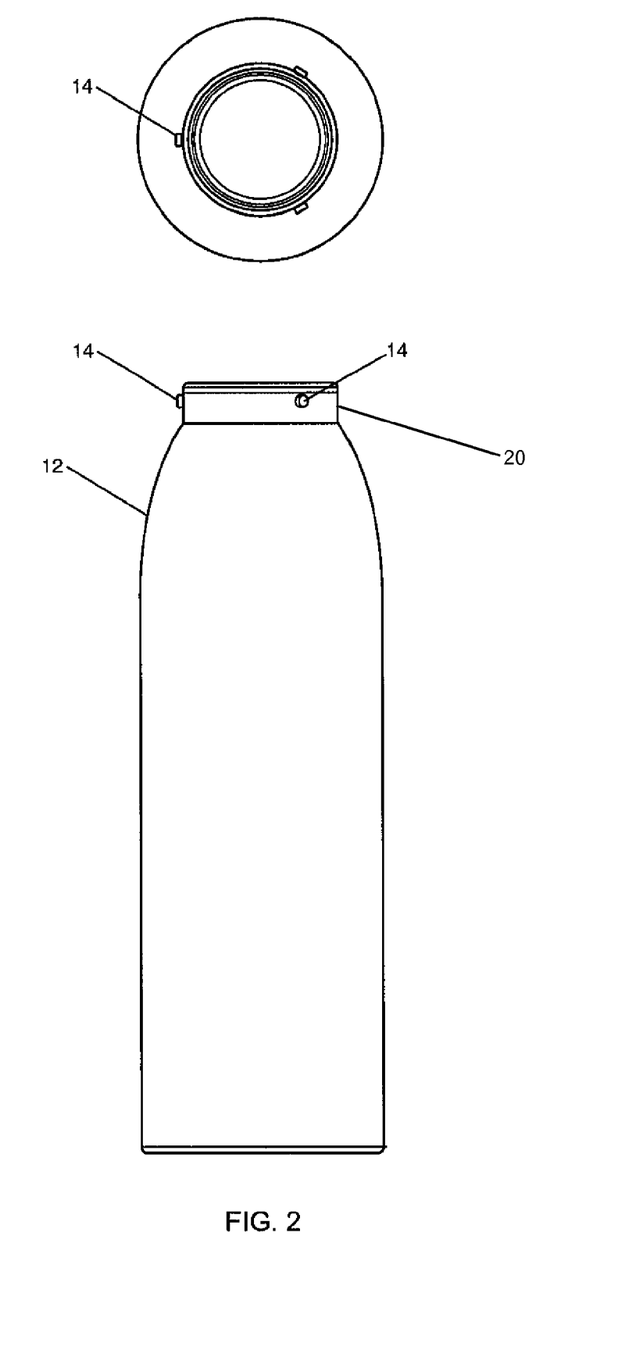
FIG. 2 illustrates an embodiment of the present invention comprising a bottle with a plurality of protrusions located around the top portion of the bottle.
Figure 3:
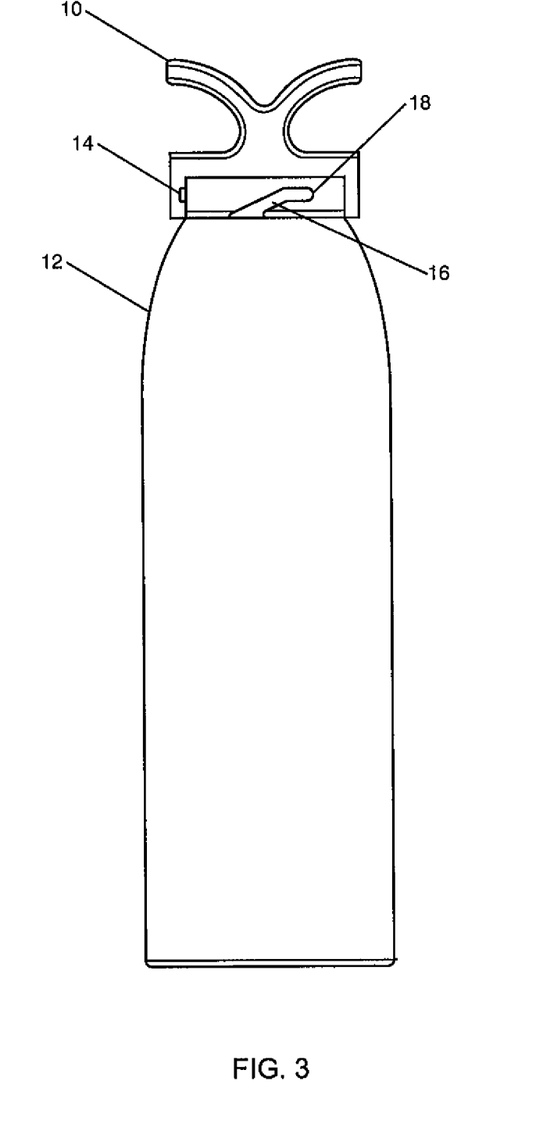
FIG. 3 illustrates an embodiment of the present invention comprising a view of a quick access closure apparatus when disposed on a bottle.

Referring to FIGS. 1A-1E, one embodiment of the present invention comprises quick access lid 10 for use with bottle 12. Bottle 12 of this embodiment comprises at least one protrusion (see FIG. 2) and preferably a plurality of protrusions and more preferably three triangulated protrusions. As illustrated in FIG. 2, protrusion 14 is preferably located around the outside top portion of bottle 12 and preferably around the neck of bottle 12. Protrusion 14 can be any shape, including but not limited to, round, spherical, rectangular, oval, square, hemispherical, triangular, and combinations thereof. Lid 10 of this embodiment is preferably secured onto bottle 12 via at least one protrusion 14, see FIG. 3.

Figure 7:
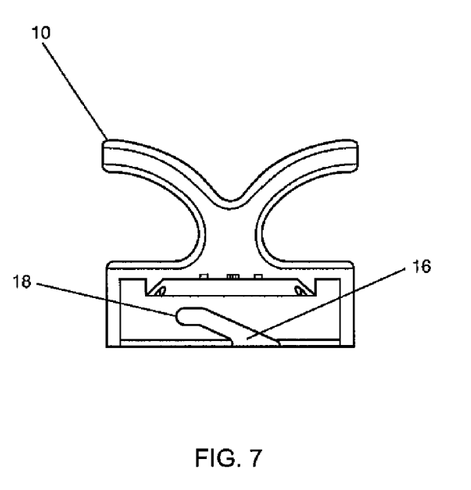
FIGS. 7-8 illustrate an embodiment of the present invention comprising a channel with a ridge disposed on a quick access lid.
Figure 8:
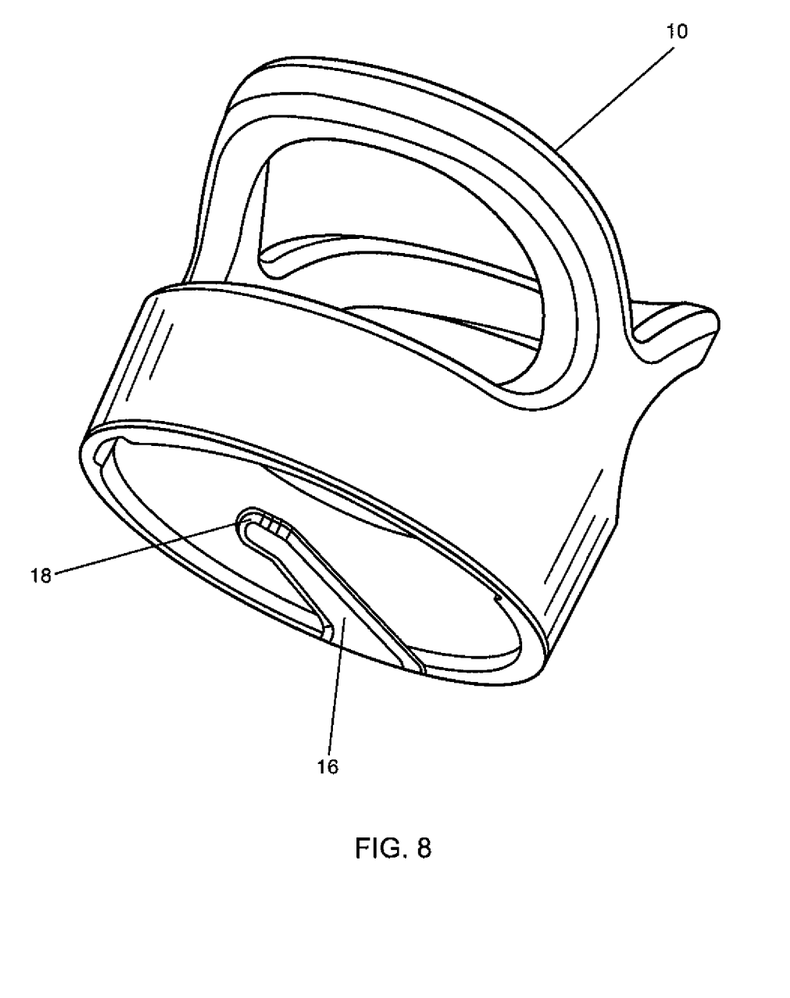

As illustrated in FIGS. 7-8, lid 10 preferably comprises at least one channel 16 that protrusion 14 slides into and then locks in place. A user preferably places lid 10 on bottle 12 and rotates lid 10 a minimal distance so that protrusion 14 on bottle 12 slides into channel 16 on lid 10. Protrusion 14 slides over ridge 18 disposed in channel 16 to secure lid 10 to bottle 12. A seal is then created between quick access lid 10 and bottle 12. To remove lid 10, a user simply rotates lid 10 a minimal distance, preferably only about 1/8 or less of a rotation, to unlock protrusion 14 from channel 16 and remove lid 10.

Figure 4:
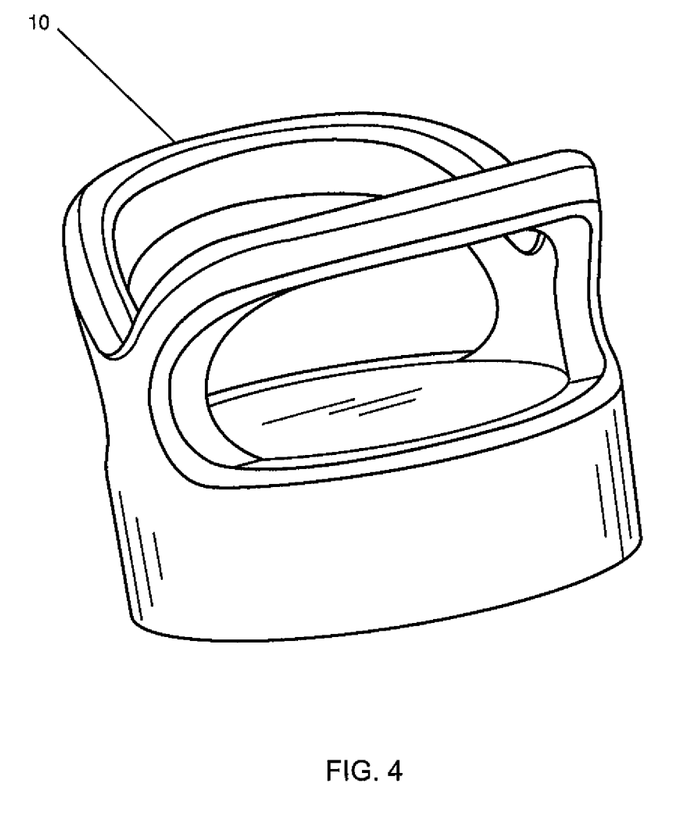
FIGS. 4-6 illustrate embodiments of the present invention comprising a quick access lid.
Figure 5:
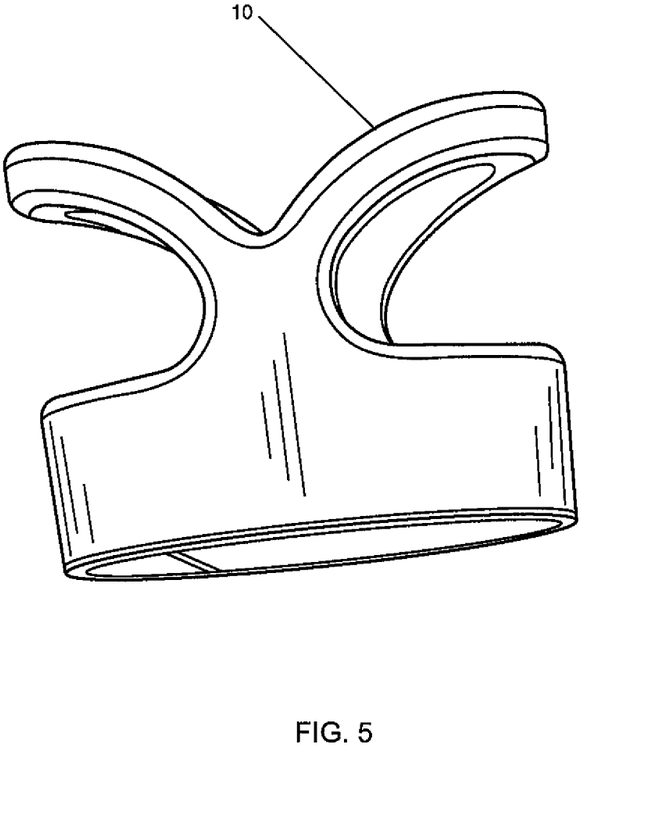
Figure 6:
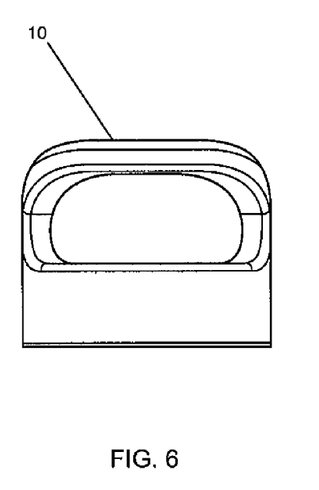

Referring to FIGS. 4-6, quick access lid 10 of an embodiment of the present invention preferably creates a substantially leak proof seal without any creases or other areas for bacteria to build. At least one protrusion 14 preferably slides into at least one channel 16 and clicks into place with a slight rotation of lid 10, preferably less than about 1/8 of a rotation of lid 10. Lid 10 is then preferably locked in place when protrusion 14 slides past ridge 18 disposed on channel 16. There is no need or requirement to push down (for example, like a child resistant pill bottle) in order to remove lid 10 from bottle 12. In order to remove lid 10 from bottle 12, as user simply rotates bottle 12 and/or lid 10 to unlatch protrusion 14 from channel 16, no pushing down of lid 10 is involved.

Figure 9:
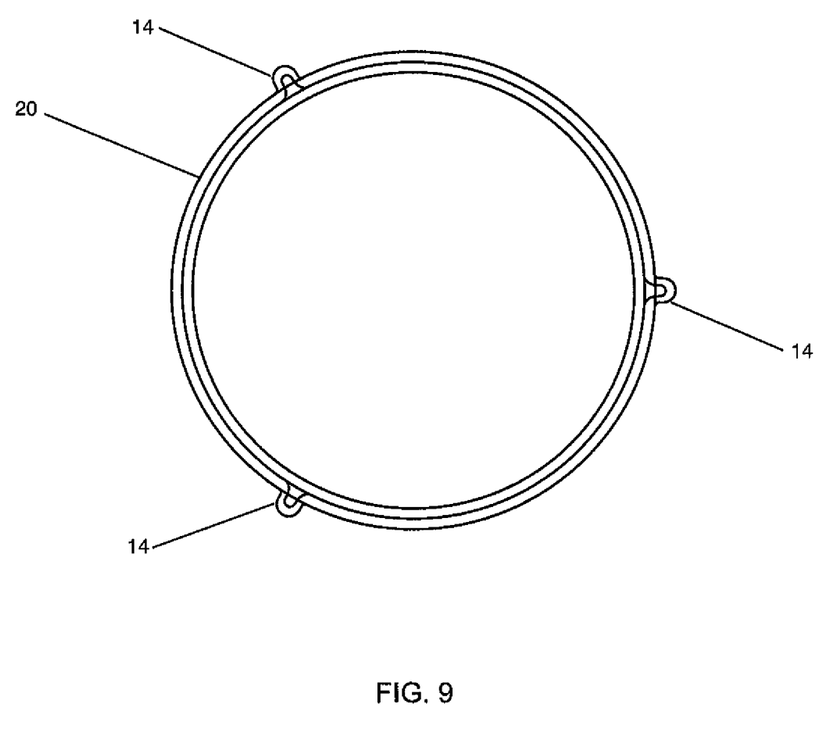
FIG. 9 illustrates an embodiment of the present invention comprising a plurality of protrusions disposed on an outsert.

Referring to FIG. 9, in another embodiment of the present invention, protrusions 14 are disposed on outsert 20 which is preferably an outsert of bottle 12 or other container and is preferably fitted over the mouth of bottle 12 and/or disposed around the neck of bottle 12. In an alternative embodiment of the present invention, protrusions 14 are formed directly on the neck of bottle 12. Protrusions 14 can optionally be welded to outsert 20 or welded directly to bottle 12. Outsert 20 is then positioned over the neck of the bottle with the protrusions protruding outward. Outsert 20 is then preferably secured to the top of bottle 12. Outsert 20 is preferably secured to the bottle by compression fitting, press fitting or interference fitting, but can also be secured by gluing, taping, soldering, stapling, welding, combinations thereof and the like. The mouth (or top edge or lip) of bottle 12 is then preferably rolled on top of outsert 20. The rolled or rounded top of bottle 12 (see rolled top of bottle 12 in FIG. 2) is preferably used to finish outsert 20, however the rolled top of bottle 12 does not necessarily hold outsert 20 in place. The rolled or rounded top of bottle 12 assists in sealing a gap between bottle 12 and outsert 20 to prevent bacteria growth. It also provides a smooth edge for insert 22 (see FIG. 10), a user's mouth, etc. Outsert 20 can optionally have a rounded edge, and bottle 12 can also optionally not be rolled or rounded.

Another embodiment of the present invention comprises a method of forming a quick access lid and corresponding bottle. The bottle preferably comprises at least one protrusion located around the top of the bottle and preferably located around the neck of the bottle. The quick access lid preferably comprises at least one channel wherein the protrusion slides into the channel thereby locking the lid in place. This method preferably comprises an outsert wherein the protrusions are created by pressing the outsert from the inside to create protrusions on the outside of the outsert.

Figure 10:
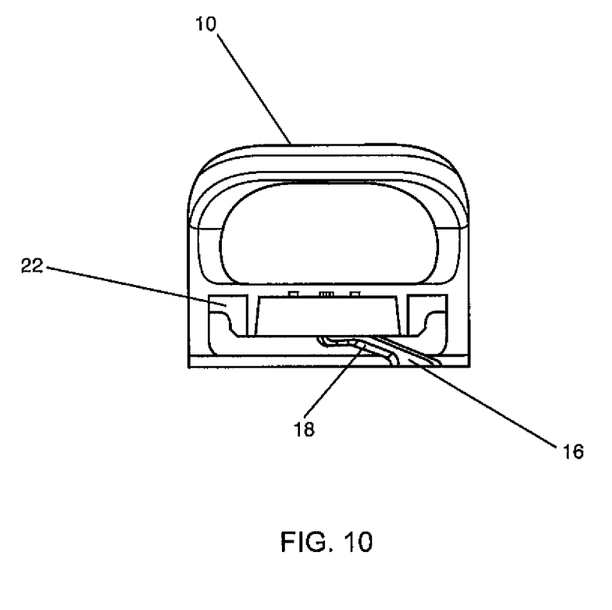
FIG. 10 illustrates an embodiment of the present invention comprises a lid having an insert.

Referring to FIG. 10, one embodiment of the present invention comprises insert 22 which is disposed around the inside circumference of lid 10. Insert 22 is preferably a ring and more preferably a silicon o-ring. Insert 22 preferably pressurizes or compresses or puts a force on the lid on the bottle to create a substantially leak proof seal. The lip or mouth of bottle 12 is preferably rounded or rolled at the top of the lip to create an area for insert 22 sit upon and seal the gap between bottle 12 and outsert 20.

Insert 22 can comprise a material that is different from the material of the quick access lid and/or bottle. Insert 22 is preferably disposed in the inner circumference of lid 10 and more preferably is disposed in a groove in lid 10, see FIG. 10. Insert 22 most preferably comprises a bulbous or irregular shaped cross-section, wherein the bulbous portion of insert 22 fits into a similar shaped or like-shaped recess or groove in lid 10. Insert 22 can comprise a material such as, but not limited to, silicon, metal, aluminum, plastic, Teflon®, rubber, and combinations thereof. Insert 22 can have any cross-sectional shape, including but not limited to, round, oval, irregular, bulbous, combinations thereof and the like. Insert 22 is preferably compressible.

A bottle preferably comprises metal, more preferably aluminum, and most preferably recycled aluminum, but can also comprise any material known in the art, including but not limited to polypropylene, polyethylene, Teflon® and the like. The bottle is preferably made from recycled material. The lid preferably comprises a plastic, but can also be any material known in the art including but not limited to metal, aluminum, rubber, EPDM, Teflon® and combinations thereof. The lid can also be made from recycled material. The lid and bottle are both preferably entirely recyclable.

In one embodiment of the present invention, a bottle is shaped such that there is a gradual taper from the mouth of the bottle to the base of the neck of the bottle. The gradual taper facilitates a smooth pour from the bottle with no splashing. The bottle is preferably smooth on the inside with no ridges or threads enabling a user to pour and/or drink from the bottle with no splashing or spilling. The smooth bottle is also easily cleaned and sanitized.

In an embodiment of the present invention, the bottle can be used to hold any type of liquid, including but not limited to, water, coffee, tea, soda, juice, milk, and combinations thereof. The bottle is preferably reusable but can also be disposable. The quick access closure system can be used for other closure systems and is not limited to a quick access closure lid for a bottle.

Figure 11:
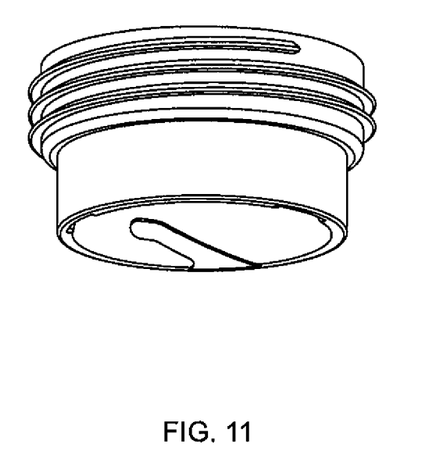
FIG. 11 illustrates an example of an adaptor for a bottle and other accessories.
Figure 12:
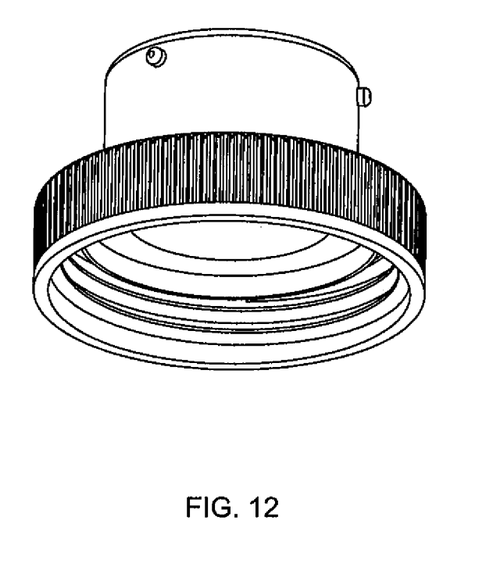
FIG. 12 illustrates an example of an adaptor for a lid and other bottles.

Referring to FIG. 11, an alternative embodiment comprises an adaptor that fits onto bottle 12 to adapt bottle 12 to fit on or secure to a threaded lid or an accessory. Referring to FIG. 12, an alternative embodiment of the present invention comprises a threaded adapter that fits onto lid 10 and modifies lid 10 to accept a threaded bottle or other threaded container. Thus, the quick access lid can be used to open and close threaded bottles when the adapter is disposed on the lid.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above and/or in the attachments, and of the corresponding application(s), are hereby incorporated by reference.

What is claimed is:

1. A quick access closure apparatus comprising:
a bottle comprising an outsert;
said outsert comprising at least one protrusion;
said outsert secured to a top portion of said bottle;
a top edge of said bottle rolled on top of said outsert forming a smooth top edge of said bottle;
a lid including a top portion and a bottom portion;
said bottom portion of said lid comprising an inner channel, a ridge within said inner channel, and a groove disposed above said inner channel;
said top portion of said lid comprising a first loop and a second loop, said loops curving up and away from a center axis of said lid in mirror image;
an insert disposed in said groove, said insert comprising an irregular shaped cross-section;

wherein said protrusion is insertable into said inner channel, and said lid is then rotatable to fit said protrusion into said ridge and click in place in order to fasten said lid to said bottle;

wherein said lid rotates less than approximately ⅛ of a full rotation around said bottle to fasten said lid to said bottle; and wherein said bottle lacks threads.

2. The apparatus of claim 1 wherein said insert is in communication with a mouth of said bottle creating a seal between said lid and said bottle.

3. The apparatus of claim 1 wherein said insert comprises a bulbous cross-section.

4. The apparatus of claim 3 wherein said groove comprises a like-shape to said insert and is mated with said insert.

5. The apparatus of claim 1 wherein said insert is compressible.

6. The apparatus of claim 1 wherein the bottle comprises a gradual taper.

7. The apparatus of claim 1 comprising three protrusions.

8. The apparatus of claim 7 wherein said protrusions form an equilateral triangle.

9. The apparatus of claim 1 wherein said bottle and lid comprise recycled material.

10. The apparatus of claim 1 wherein said bottle comprises a rolled lip at a mouth of said bottle.

\* \* \* \* \*